United States Patent [19]

Watanabe et al.

[11] Patent Number: 4,668,452

[45] Date of Patent: May 26, 1987

[54] PROCESS FOR PRODUCING SILICON CARBIDE HEATING ELEMENTS

[75] Inventors: Masakazu Watanabe; Akiyasu Okuno; Shunkichi Nozaki; Yasushi Matsuo; Isamu Fukuura, all of Aichi, Japan

[73] Assignee: NGK Spark Plug Co., Ltd., Aichi, Japan

[21] Appl. No.: 707,257

[22] Filed: Mar. 1, 1985

Related U.S. Application Data

[63] Continuation of Ser. No. 238,516, Feb. 26, 1981, abandoned.

[30] Foreign Application Priority Data

Feb. 26, 1980 [JP] Japan .................................. 55-23161
Jun. 17, 1980 [JP] Japan .................................. 55-81881

[51] Int. Cl.$^4$ ........................................... C04B 35/56
[52] U.S. Cl. ...................................... 264/63; 264/65; 264/66; 501/90
[58] Field of Search .................... 264/63, 65, 66, 322; 501/90

[56] References Cited

U.S. PATENT DOCUMENTS 4,004,934 1/1977 Prochazka ............................ 264/65
4,120,827 10/1978 Boos ..................................... 264/65
4,336,216 6/1982 Watanabe et al. ..................... 264/66

OTHER PUBLICATIONS

Prochazka et al., Atmosphere Effects in Sintering of Silicon Carbide, Technical Information Series, General Electric Co., Oct. 1978.

*Primary Examiner*—James Derrington
*Attorney, Agent, or Firm*—Sughrue, Mion, Zinn, Macpeak & Seas

[57] ABSTRACT

A process for producing a silicon carbide heating element is disclosed comprising: adding boron or a boron compound in an amount corresponding to from 0.3 to 3.0% by weight as boron, and carbon or a carbon compound in an amount corresponding to from 0.1 to 6.0% by weight as carbon, to a SiC powder having an average particle size of 1.0μ or less; blending and molding the mixture; conducting a primary sintering in vacuum or in an inert atmosphere, except nitrogen; and thereafter conducting a secondary sintering at from 1500° to 2300° C. in a pressurized nitrogen atmosphere to produce a silicon carbide heating element having a density of at least 80% based on the theoretical density and an electrical resistivity of 1.0 Ω-cm or less.

6 Claims, 7 Drawing Figures

PROCESS FOR PRODUCING SILICON CARBIDE HEATING ELEMENTS

This is a continuation of application Ser. No. 238,516, filed Feb. 26, 1981, now abandoned.

BACKGROUND OF THE INVENTION

The present invention relates to a process for producing silicon carbide heating elements having improved strength, low electrical resistivity and a low negative temperature coefficient of resistance.

Silicon carbide heating elements have for sometime been used as heating elements for electric furnaces, and more recently, they have been used as heating elements for various industrial instruments. For such uses, the silicon carbide is required to have high strength, low electrical resistivity and a low negative temperature coefficient of resistance. Among processes developed recently for sintering SiC, a few processes are the following:

(1) Japanese Patent Application (OPI) No. 78609/75 (the term "OPI" as used herein refers to a "published unexamined Japanese patent application"), entitled "Process For Producing Silicon Carbide Ceramics Having High Density", describes a sintered material having a density of more than 95%, based on the theoretical density, obtained by sintering a mixture of SiC, a boron compound and a carbonaceous material at 2050° C. in Ar for 60 minutes. The theoretical density hereinafter refers to a density of SiC single crystal. However, it is not suitable as a heating element, because the electrical resistivity is too high at room temperature and too low at a high temperature (for example, 500° to 1500° C.).

If sintering is carried out in nitrogen at atmospheric pressure from the beginning at less than 2200° C., though the electrical resistivity is less than 1.0 $\Omega$-cm, the density is only about 80% or so based on the theoretical density, and the strength is low. Furthermore, if the sintering is carried out at a higher temperature, though the density increases to about 90% based on the theoretical density, the electrical resistivity becomes as large as from 10 to $10^6$ $\Omega$-cm, and is lacking in stability.

(2) Japanese Patent Application (OPI) No. 110499/77, entitled "Fuel Igniter Comprising A Novel Silicon Carbide Composition And Process For Preparing The Composition", describes a process comprising sintering a powder comprising more than 95% SiC by hot pressing to a density of 2.5 g/cc, and doping with N, P, As, Sb, or Bi as solid phase or a vapour phase (that is, the N, P, As, Sb, or Bi can be introduced by simply mixed solids containing the noted elements or, by permeation of vapour of the noted element) to obtain the electrical resistivity of 0.66 $\Omega$-cm at room temperature. However, the product is not suitable as a power economization type heating element, because the electrical resistivity at 1350° C. is 0.12 $\Omega$-cm and the temperature coefficient of resistance is inferior.

(3) Japanese Patent Application (OPI) No. 121810/78, entitled "Sintered Silicon Carbide Having High Density And High Thermal Impact Resistance", describes a product having a density of at least 85%, based on the theoretical density, produced by adding from 0.3 to 3.0% by weight of BN, BP or AlB$_2$ as an additive and furthermore from 150 to 500% by weight of C, based on the boron content of the boron additive, and sintering the resulting mixture at from 1900° to 2500° C., which is substantially equal in the sintering processes and the physical or electrical properties of the resulting sintered material to a sintered material obtained at an atmospheric pressure described in Japanese Patent Application (OPI) No. 78609/75. In such a sintered material having a density of 95% or more based on the theoretical density, there is a fault that oxidation resistance is somewhat inferior to that of B or B$_4$C added type materials.

Thus, there has been proposed in Japanese Patent Application No. 72464/79 (corresponding to U.S. Ser. No. 157,738), now U.S. Pat. No. 4,336,216 entitled "Process For Producing Silicon Carbide Heating Elements", a process for producing silicon carbide heating elements which comprises adding boron or a boron compound in an amount corresponding to 0.3 to 3.0% by weight as boron and carbon or a carbon compound in an amount corresponding to 0.1 to 3.0% by weight as carbon to a SiC powder having 1.0$\mu$ or less of the average particle size, blending and molding the mixture, carrying out primary sintering in vacuum or in an inert atmosphere, except nitrogen, to obtain a density of from 70 to 95% based on the theoretical density, and thereafter carrying out secondary sintering at from 1600° to 2200° C. in a nitrogen atmosphere to produce a silicon carbide heating element having a density of at least 80% based on the theoretical density and an electrical resistivity of 1.0 $\Omega$-cm or less. The resulting material has high strength because of having high density and has low resistance, and the electrical resistivity at a high temperature thereof does not decrease significantly.

SUMMARY OF THE INVENTION

However, it has now been found that the influence obtained by nitrogen addition can be further improved and the electrical resistivity can be decreased by changing the nitrogen atmosphere in the secondary sintering for a pressurized nitrogen atmosphere.

Accordingly, the present invention relates to a process for producing a silicon carbide heating element comprising: adding boron or a boron compound in an amount corresponding to 0.3 to 3.0% by weight as boron and carbon or a carbon compound in an amount corresponding to 0.1 to 6.0% by weight as carbon to a SiC powder having the average particle size of 1.0$\mu$ or less; blending and molding the mixture; carrying out primary sintering in vacuum or in an inert atmosphere, except nitrogen; and thereafter carrying out secondary sintering at from 1500° to 2300° C. in a pressurized nitrogen atmosphere to produce a silicon carbide heating element having a density of at least 80% based on the theoretical density and an electrical resistivity of 1.0 $\Omega$-cm or less.

DETAILED DESCRIPTION OF THE INVENTION

Figure 1:
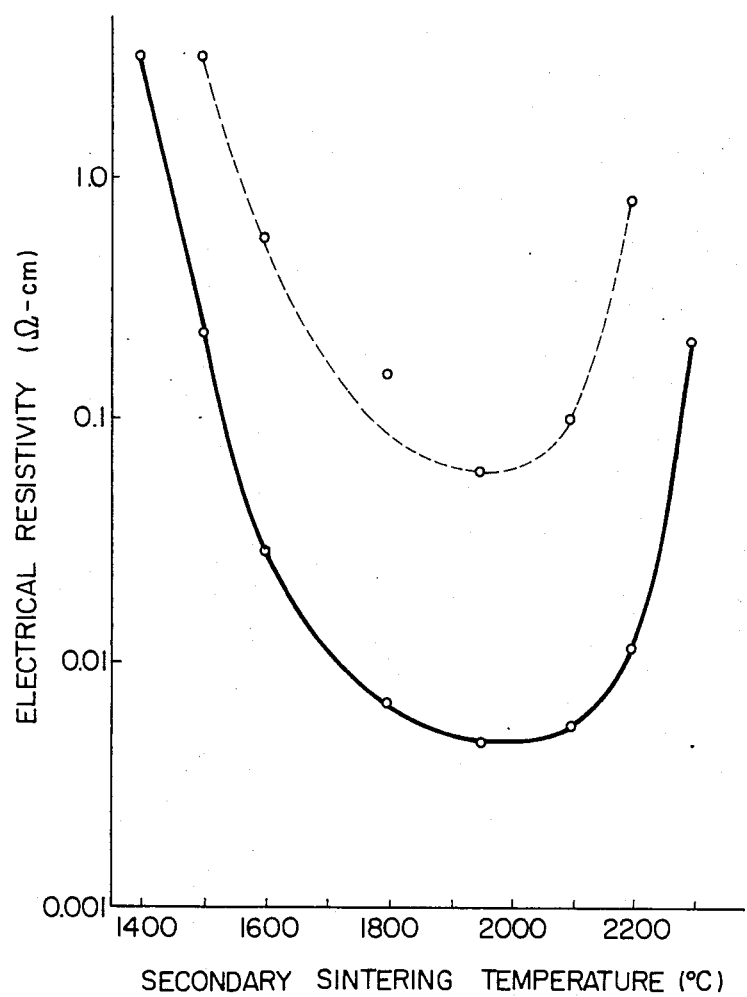
FIG. 1 is a graph which shows a relationship between the sintering temperature of the secondary sintering and the electrical resistivity in a case of using a $\beta$-SiC powder available on the market as a SiC powder.

In this invention, all of the α-SiC or β-SiC powders employed as the SiC powders are available on the market, accordingly, they are including a small amount of the unavoidable impurities such as Fe, Al, $SiO_2$ and so on.

According to the above-mentioned process of the present invention, even if the mixtures of α-SiC powder and β-SiC powder mixed with various mixing ratios are employed as a SiC powder, silicon carbide heating elements having almost constant characteristics can be produced.

However, it is economically desired to use α-SiC powder as the SiC powder, because the α-SiC powder is relatively less expensive and is easier to obtain it than β-SiC powder.

The reason why the sintering is divided into a primary sintering at 1850° C. to 2050° C. in vacuum or in an inert atmosphere except nitrogen and a secondary sintering in a pressurized nitrogen atmosphere is that although sintered materials having electrical resistivity controlled within a desired range can be obtained by sintering in a pressurized nitrogen atmosphere from the beginning, the density thereof does not increase to at least 80% based on the theoretical density and, consequently, the fracture strength does not reach the desired value, that is, at least 10 Kg/mm².

When the primary sintered material obtained by calcining the molding prepared by mixing the boron or boron compound and carbon or carbon compound with the mixtures of α-SiC powder and β-SiC powder mixed with various mixing ratios as a SiC powder is subjected to the secondary sintering at the atmospheric pressure of nitrogen gas to prepare a secondary sintered material, the electrical resistivity becomes extremely reduced in the case wherein the amount of α-SiC powder is less than 5% by weight based on the total weight of the mixture of SiC powder, but the electrical resistivity is hardly reduced in the case wherein the amount of α-SiC powder is at least 5% by weight based on the total weight of the mixture of SiC powder. However, when raising the nitrogen gas pressure, even if the amount of α-SiC powder is at least 5% by weight based on the total weight of the mixture of SiC powder, the electrical resistivity is still extremely reduced and the secondary sintered material can be effectively utilized over a wider range of mixture ratios.

When the mixture containing less than 5% by weight (based on the total weight of the mixture of SiC powder) α-SiC powder, and the balance β-SiC powder (hereinafter referred to as a β-SiC prime mixture) is employed as the SiC powder, the sintering density obtained in the primary sintering is from 70 to 95% based on the theoretical density, and the pressurized nitrogen atmosphere is an atomsphere having a pressure of more than 1 atmosphere, and is preferably less than 200 atmospheres, and more preferably from 1.5 to 100 atmospheres, particularly from 5 to 100 atmospheres.

The sintering is conducted in the primary sintering to obtain a density of from 70 to 95%, based on the theoretical density. Particularly, if the density of the primary sintered body is less than 70%, the density of 80% which is finally required can not be obtained even if the secondary sintering is carried out. On the other hand, if it is more than 95%, the inner part of the sintered material is not subjected to the influence of nitrogen in the secondary sintering in nitrogen, because closed pores are formed in the sintered material and open pores which pass through the inner part thereof are not formed.

When a mixture containing at least 5% by weight (based on the total weight of the mixture of SiC powder) α-SiC powder and the balance β-SiC powder (hereinafter referred to as an α-SiC prime mixture) is employed as the SiC powder, the sintering density obtained in the primary sintering is from 80 to 95%, based on the theoretical density, and the pressurized nitrogen atmosphere is an atmosphere having a pressure of more than 1 atmosphere and preferably less than 500 atmospheres. The reasons why the sintering is conducted to obtain a density in the primary sintering of from 80 to 95% based on the theoretical density are the same as the case wherein the SiC powder is the β-SiC prime mixture.

One reason why the particle size of the SiC powder is 1.0μ or less is that sintered materials having the required density can not be obtained if the particle size is more than 1.0μ. Another reason is to increase the relative surface area of the primary sintered material so that the doping with nitrogen can be sufficiently carried out.

As a boron compound to be added, it is preferred to use elementary boron, boron carbide, and other boron compounds, by which the sintering property of SiC is improved. The sintering property described above refers to a degree of capacity of making a sintering body densify. The lower limit thereof is 0.3% as boron (based on the weight of SiC powder), because the sintering property is less improved if the amount is less than 0.3%. The upper limit thereof is 3.0% as boron, because the boron compound accelerates growth of SiC particles to cause deterioration of the sintering property if the amount is more than 3.0%. Since boron is an electrically positive doping agent, the electrical characteristics of the heating element can not be improved thereby.

On the other hand, the carbon improves the sintering property and controls growth of SiC particles by deoxygenation of an oxidized layer on the surface of the SiC particles. However, the lower limit thereof is 0.1% as carbon (based on the weight of SiC powder), because the effect is not achieved when the amount is less than 0.1%, and the upper limit is 6.0%, because free carbon is formed when the amount is more than 6.0%, which deteriorates the physical properties, particularly the fracture strength of the sintered materials.

Examples of the boron compound contain B, $B_4C$, BN, BP, $AlB_2$, $SiB_6$, etc., and examples of the carbon compound contain a phenol resin, carbon black, polyphenylene, polymethylphenylene, etc.

The secondary sintering in nitrogen has a function of reducing the electrical resistivity. The sintering temperature is from 1500° to 2300° C. If it is less than 1500° C., the reduction of the electrical resistivity by permeation of nitrogen atoms is inferior. If it is more than 2300° C., not only does the volatilization amount increase but also $N_2$ reacts with SiC to cause adhesion of scales to the surface of the sintered material and the electrical resistivity becomes as large as from 10 to $10^6$ Ω-cm. This state is shown in FIG. 1 for the case when the SiC powder is the β-SiC powder available on the market, and in FIG. 2 for the case when the SiC powder is the α-SiC powder available on the market.

In the drawings, the abscissa shows the temperature of secondary sintering and the ordinate shows the electrical resistivity of the sintered material, the dashed line shows the case wherein the pressure of $N_2$ is 1 atmosphere and the solid line shows the case wherein the pressure is 80 atmospheres. According to the drawings, the resistivity is reduced for every secondary sintering temperature when the sintering is carried out at 80 atmospheres in $N_2$ as compared to when it is carried out at 1 atmosphere. Accordingly, it is possible to make the electrical resistivity to 1.0 Ω-cm or less when the temperature is 1500° to 2300° C.

Figure 3:
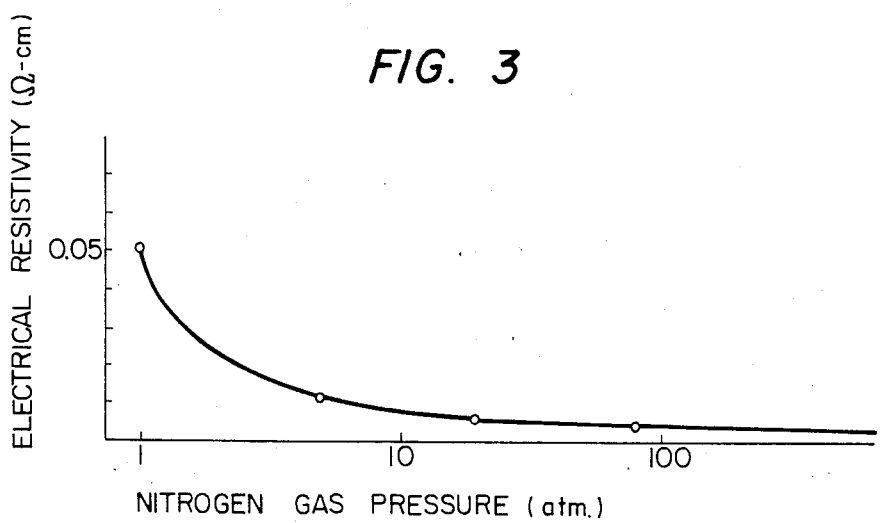
FIG. 3 is a graph which shows the relationship between the nitrogen gas pressure and the electrical resistivity in a case wherein a product using a $\beta$-SiC powder available on the market as a SiC powder and obtained by primary sintering at 1950° C. is subjected to secondary sintering in nitrogen.
Figure 4:
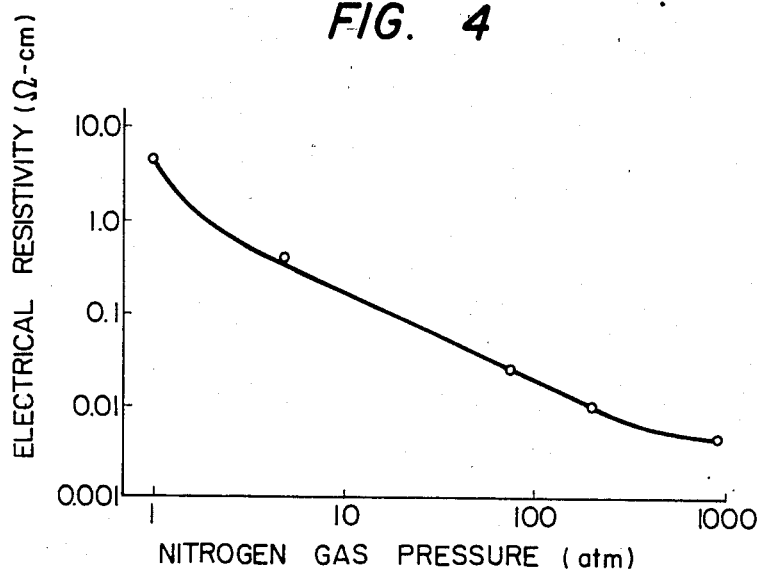
FIG. 4 is a graph which shows the relationship between the nitrogen gas pressure and the electrical resistivity in a case wherein a product using an α-SiC powder available on the market as a SiC powder and obtained by primary sintering at 2000° C. is subjected to secondary sintering in nitrogen.

The reason why the secondary sintering is conducted in a pressurized atmosphere is that, as shown in FIG. 3, when the primary sintered materials having a density of 93% based on the theoretical density, wherein the SiC powder is the β-SiC powder available on the market, are sintered at 1980° C. for 3 hours as secondary sintering, and in FIG. 4, when the primary sintered materials having a density of 93% based on the theoretical density, wherein the SiC powder is the α-SiC powder available on the market, are sintered at 1950° C. for 3 hours as secondary sintering, the electrical resistivity can be remarkably reduced by increasing the pressure of $N_2$ gas. That is, upon increasing the pressure of $N_2$ gas from 1 atmosphere (atmospheric pressure), the range of the effective secondary sintering temperature is broad, and the electrical resistivity is reduced. However, an incremental efficiency of the effect decreases with the further increase of pressure. Thus, when the SiC powder is the β-SiC prime mixture, no substantial further effect is obtained if the pressure is increased beyond 200 atmospheres, and the cost of equipment therefor significantly increases. For the same reasons, the more preferred pressure range is from 1.5 to 100 atmospheres.

Furthermore, when the SiC powder is the α-SiC prime mixture, no substantial further effect is obtained if the pressure is increased beyond 500 atmospheres for the same reason described above. The reason why the electrical resistivity can be reduced by increasing the pressure of the $N_2$ gas atmosphere during the secondary sintering is not understood. However, it is believed that the formation of a solid solution of N atoms is achieved by increasing the pressure to significantly increase the number of free electrons by substitution of the N atom for the C atom.

The density of the heating element is 80% or more, based on the theoretical density, because the fracture strength is too low if it is less than 80%. The electrical resistivity is 1.0 Ω-cm or less, because power economization type heating elements are difficult to design if it is more than 1.0 Ω-cm.

In the following, the present invention is illustrated in greater detail by reference to examples.

EXAMPLE 1

A β-SiC powder which is available on the market and has an average particle size of 0.3μ and a boron carbide powder in the amount of 0.5% by weight, based on the weight of the SiC powder, were dispersed in a solution prepared by dissolving phenol resin in the amount of 6% based on the SiC powder in acetone. The mixture was blended by a wet mixing process, dried, screened, pressed and calcined at 800° C. in vacuum to prepare moldings.

Figure 5:
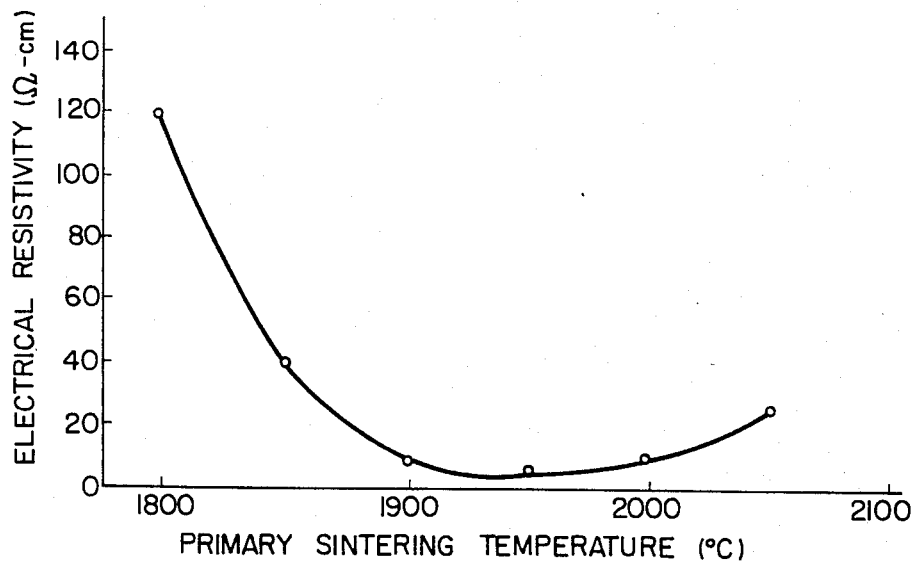
FIG. 5 is a graph which shows a relationship between the primary sintering temperature and the electrical resistivity in a case of using a β-SiC powder available on the market as a SiC powder.

Moldings thus prepared were subjected to the primary sintering by sintering at a temperature from 1800° to 2050° C. in an Ar stream for 60 minutes to produce a primary sintered material. The relatin between the sintering temperature thereof and the electrical resistivity is shown by the graph of FIG. 5. Then samples sintered at 1950° C. were subjected to the secondary sintering by heat treatment under a pressure of 80 atmospheres in $N_2$ to produce a secondary sintered material. The relation of the sintering temperature thereof and the electrical resistivity is shown in FIG. 1 as a solid line. It is understood therefrom that the most preferred electrical resistivity is obtained at a secondary sintering temperature in the range of from 1500° to 2300° C. according to the present invention.

The characteristics in the examples were evaluated by the following evaluation methods:

(1) Electrical resistivity: Electrical resistivity was evaluated according to four-terminal method by means of a constant-voltage source.

(2) Fracture strenth: JIS B-4104.

Properties of products according to the present invention and those of comparative products outside the scope of the present invention are shown in Table 1 below.

TABLE 1

| | Primary Sintered Material | | Secondary Sintered Material | | | | | |
|---|---|---|---|---|---|---|---|---|
| No. | Density (% of Theoretical) | Electrical Resistivity At Room Temperature (Ω-cm) | Heating Temperature (°C.) | Nitrogen Pressure (Atmosphere) | Density (% of Theoretical) | Electrical Resistivity At Room Temperature (Ω-cm) | Fracture Strength (kg/mm²) | Note |
| 1R | 60 | $10^2$ | 2100 | 20 | 76 | 0.05 | 8 | Comparative Sample |
| 2 | 70 | 40.5 | " | " | 85 | 0.007 | 18 | Present Invention |
| 3 | 80 | 10.0 | " | " | 87 | 0.006 | 28 | Present Invention |
| 4 | 90 | 3.9 | 1950 | " | 90 | 0.005 | 42 | Present Invention |
| 5 | 93 | 11.3 | " | 2 | 93 | 0.024 | 46 | Present |

TABLE 1-continued

| | Primary Sintered Material | | Secondary Sintered Material | | | | | |
|---|---|---|---|---|---|---|---|---|
| No. | Density (% of Theoretical) | Electrical Resistivity At Room Temperature (Ω-cm) | Heating Temperature (°C.) | Nitrogen Pressure (Atmosphere) | Density (% of Theoretical) | Electrical Resistivity At Room Temperature (Ω-cm) | Fracture Strength (kg/mm$^2$) | Note |
| 6 | " | 11.3 | " | 5 | " | 0.012 | " | Present Invention |
| 7 | " | 11.0 | " | 20 | " | 0.007 | " | Present Invention |
| 8 | " | 11.0 | " | 80 | " | 0.005 | " | Present Invention |
| 9 | " | 11.1 | " | 200 | " | 0.004 | " | Present Invention |
| 10 | 95 | 10$^2$ | " | 20 | 95 | 0.09 | 51 | Present Invention |
| 11 | " | 10$^2$ | " | 80 | " | 0.06 | " | Present Invention |
| 12R | 98 | 10$^5$ | " | " | 98 | 10$^3$ | 55 | Comparative Sample |

EXAMPLE 2

Figure 2:
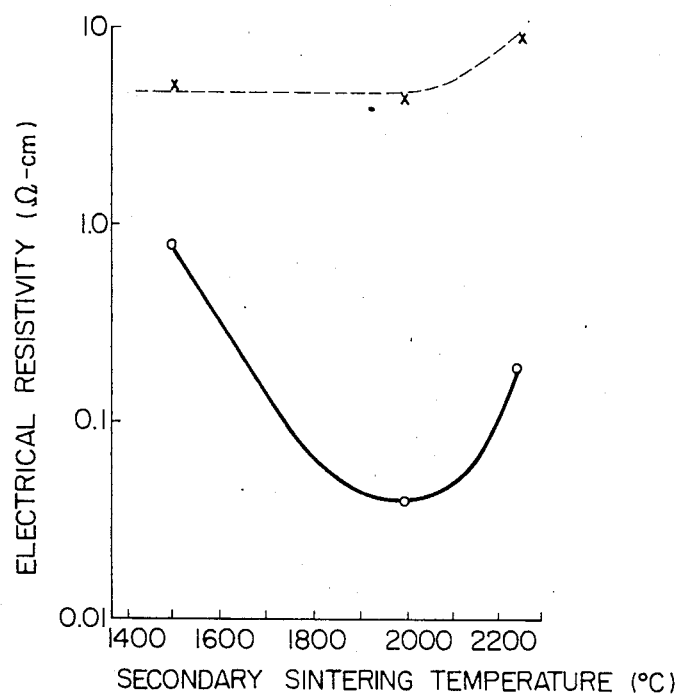
FIG. 2 is a graph which shows a relationship between the sintering temperature of the secondary sintering and the electrical resistivity in a case of using an $\alpha$-SiC powder available on the market as a SiC powder.
Figure 6:
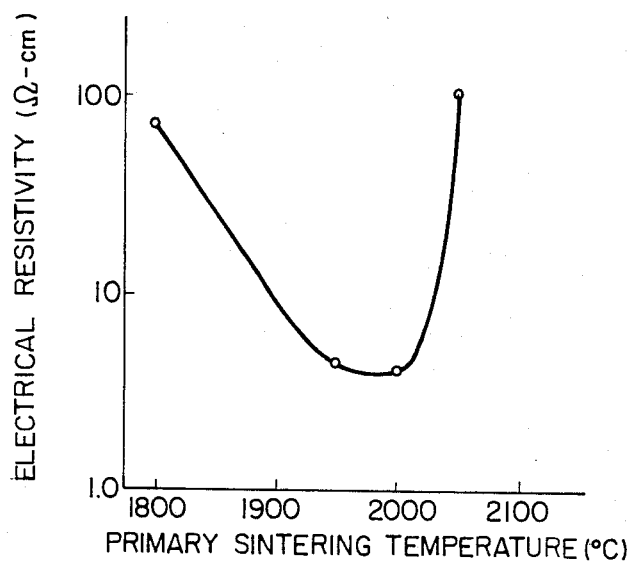
FIG. 6 is a graph which shows a relationship between the primary sintering temperature and the electrical resistivity in a case of using an α-SiC powder available on the market as a SiC powder.

A primary sintered material was obtained in the same manner as in Example 1, except that an α-SiC powder available on the market was used as the SiC powder. The relation between the sintering temperature thereof and the electrical resistivity is shown in FIG. 6. Then samples sintered at 2000° C. were subjected to the secondary sintering by heat treatment under a pressure of 80 atmospheres in N$_2$ to produce a secondary sintered material. The relationship between the sintering temperature thereof and the electrical resistivity is shown in FIG. 2 as a solid line. It is understood therefrom that the most preferred electrical resistivity is obtained at a secondary sintering temperature in the range of from 1500° to 2300° C. according to the present invention.

Properties of products according to the present invention and those of comparative products outside the scope of the present invention are shown in Table 2 below.

TABLE 2

| | Primary Sintered Material | | Secondary Sintered Material (Heating Temperature of 2000° C.) | | | |
|---|---|---|---|---|---|---|
| No. | Density (% of Theoretical) | Electrical Resistivity At Room Temperature (Ω-cm) | Nitrogen Pressure (Atmosphere) | Electrical Resistivity At Room Temperature (Ω-cm) | Fracture Strength (kg/mm$^2$) | Note |
| 1R | 72 | 45 | 80 | 0.20 | 2 | Comparative Sample |
| 2 | 81 | 24 | 80 | 0.13 | 22 | Present Invention |
| 3 | 88 | 4.8 | 80 | 0.07 | 35 | Present Invention |
| 4 | 90 | 4.1 | 80 | 0.07 | 38 | Present Invention |
| 5 | 93 | 4.2 | 1 | 3.5 | 40 | Comparative Sample |
| 6 | 93 | 3.9 | 5 | 0.3 | 40 | Present Invention |
| 7 | 93 | 4.2 | 20 | 0.1 | 40 | Present Invention |
| 8 | 93 | 4.1 | 80 | 0.04 | 40 | Present Invention |
| 9 | 93 | 3.9 | 200 | 0.01 | 40 | Present Invention |
| 10 | 95 | 10$^2$ | 80 | 0.1 | 44 | Present Invention |
| 11R | 97 | 10$^4$ | 80 | 10$^3$ | 50 | Comparative Sample |

Furthermore, the properties of prior art products are shown in Table 3.

TABLE 3

| Sample No. | Sintering Temperature (°C.) | Density (% of Theoretical) | Electrical Resistivity At Room Temperature (Ω-cm) | Electrical Resistivity At Room Temperature Electrical Resistivity at 1350° C. | Fracture Strength (kg/mm$^2$) | Note |
|---|---|---|---|---|---|---|
| 101R | 2050 | 72.5 | 0.12 | 2.4 | 10 | Japanese Patent Application |

TABLE 3-continued

| Sample No. | Sintering Temperature (°C.) | Density (% of Theoretical) | Electrical Resistivity At Room Temperature ($\Omega$-cm) | Electrical Resistivity At Room Temperature — Electrical Resistivity at 1350° C. | Fracture Strength (kg/mm$^2$) | Note |
| --- | --- | --- | --- | --- | --- | --- |
| 102R | 2100 | 81.3 | 0.09 | 1.8 | 15 | (OPI) No. 78609/75 Japanese Patent Application (OPI) No. 78609/75 |
| 103R | 2200 | 92.2 | 10 | 30 | 30 | Japanese Patent Application (OPI) No. 78609/75 |
| 104R | 2300 | 96.3 | 10$^4$ | — | 25 | Japanese Patent Application (OPI) No. 78609/75 |
| 105R | — | 80 | 0.66 | 5.5 | — | Japanese Patent Application (OPI) No. 110499/75 |
| 106R | 1300 to 2000 | — | 0.01 to 10 | — | 10 | Japanese Patent Application (OPI) No. 87950/79 |

As can be understood from Table 1 and Table 2, the present invention provides a process for producing silicon carbide heating elements having an electrical resistivity of 1.0 $\Omega$-cm or less, a low negative temperature coefficient of resistance and high fracture strength, which are thus of industrial value. Accordingly, they are widely utilized as igniters for internal combustion engines, such as in glow plugs and other heating elements.

EXAMPLE 3

When the examination was carried out in the same manner as in Example 1 except that SiC powder comprising 5% by weight α-SiC powder and 95% by weight β-SiC powder each available on the market was used, results shown in Table 4 were obtained.

produce a primary sintered material having a density of about 93% based on the theoretical density. Then molding sample was subjected to the secondary sintering by heat treatment at various temperatures under a pressure of 80 atmospheres in N$_2$ to produce secondary sintered materials.

Figure 7:
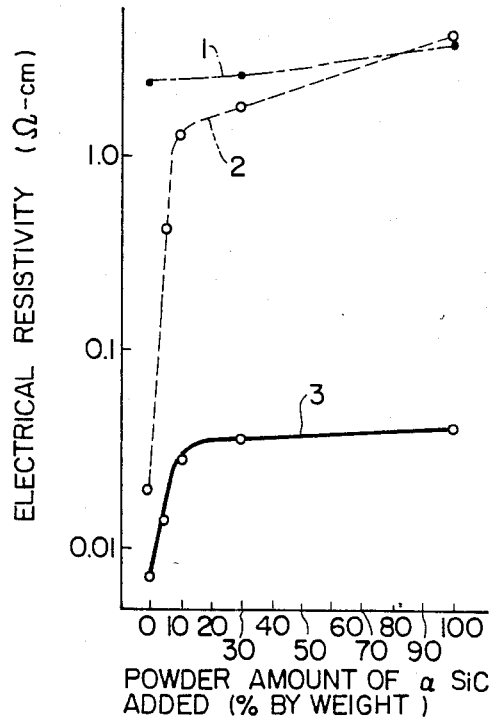
FIG. 7 is a graph which shows the relationship between the amount of α-SiC powder added and the electrical resistivity.

The relationship between the content of α-SiC powder thereof and the electrical resistivity is shown in FIG. 7.

In FIG. 7, the non-uniform dashed line 1 shows the electrical resistivity of primary sintered material, the uniform dashed line 2 shows the electrical resistivity of the sample sintered by heat treatment under atmospheric pressure in N$_2$, and the solid line 3 shows the electrical resistivity of the sample sintered by heat treatment under a pressure of 80 atmospheres in N$_2$. As can

TABLE 4

| | Primary Sintered Material | | Secondary Sintered Material | | | | | |
| --- | --- | --- | --- | --- | --- | --- | --- | --- |
| Sample No. | Density (% of Theoretical) | Electrical Resistivity At Room Temperature ($\Omega$-cm) | Heating Temperature (°C.) | Nitrogen Pressure (Atmosphere) | Density (% of Theoretical) | Electrical Resistivity At Room Temperature ($\Omega$-cm) | Fracture Strength (kg/mm$^2$) | Note |
| 13R | 60 | 10$^2$ | 2100 | 20 | 76 | 0.07 | 8 | Comparative Sample |
| 14 | 70 | 40 | 2100 | 20 | 85 | 0.008 | 18 | Present Invention |
| 15 | 80 | 10 | 2100 | 20 | 87 | 0.007 | 28 | Present Invention |
| 16 | 90 | 2 | 1950 | 20 | 90 | 0.006 | 40 | Present Invention |
| 17 | 93 | 5 | " | 20 | 93 | 0.008 | 45 | Present Invention |
| 18 | " | 5 | " | 80 | 93 | 0.006 | 45 | Present Invention |
| 19 | 95 | 10$^2$ | " | 80 | 95 | 0.10 | 50 | Present Invention |
| 20R | 98 | 10$^5$ | " | 80 | 98 | 10$^3$ | 53 | Comparative Sample |

It is understood from Table 4 that there was no great difference between the case using SiC powder prepared by adding a small amount of α-SiC powder to β-SiC powder and the case of using only β-SiC powder available on the market.

EXAMPLE 4

Moldings were obtained in the same manner as in Example 2, except that the mixtures of α-SiC powder and β-SiC powder each available on the market mixed with various mixing ratios were used as SiC powders.

These moldings were subjected to a primary sintering at about 2000° C. in an Ar stream for 60 minutes to be understood from FIG. 7, when the secondary sintering by heat treatment under atmospheric pressure in N$_2$ is conducted, the electrical resistivity can be reduced in the case wherein the content of α-SiC powder is less than 5% by weight, but the electrical resistivity is essentially un-reduced in the case wherein the content of α-SiC powder is 5% by weight or more.

However, by increasing the pressure of nitrogen gas to 80 atmospheres, the electrical resistivity is significantly reduced even if the content of α-SiC powder is 5% by weight or more, and the secondary sintered material can be utilized with a wide variety of SiC powders.

While the invention has been described in detail and with reference to specific embodiment thereof, it will be apparent to one skilled in the art that various changes and modifications can be made therein without departing from the spirit and scope thereof.

What is claimed is:

1. A process for producing a silicon carbide heating element comprising:
    (A) adding boron or a boron compound in an amount corresponding to from 0.3 to 3.0% by weight as boron, and carbon or a carbon compound in an amount corresponding to from 0.1 to 6.0% by weight as carbon, to a SiC powder having an average particle size of $1.0\mu$ or less; blending and molding the mixture, wherein said SiC powder is a mixture of at least 10% by weight α-SiC powder and the balance β-SiC powder;
    (B) conducting a primary sintering at a temperature of from 1850° to 2050° C. in vacuum or in an inert atmosphere, except nitrogen; and thereafter
    (C) conducting a secondary sintering at from 1500° to 2300° C. in a pressurized nitrogen atmosphere of more than 5 to about 500 atmospheres to produce a silicon carbide heating element having a density of at least 80% based on the theoretical density and an electrical resistivity of 1.0 Ω-cm or less.

2. A process for producing silicon carbide heating elements as in claim 1, wherein the sintering density produced in the primary sintering is from 70 to 95% based on the theoretical density.

3. A process for producing a silicon carbide heating element as in claim 1, wherein the pressure of the atmosphere in the secondary sintering is from 5 to 100 atmospheres.

4. A process for producing silicon carbide heating elements as in claim 1, wherein the sintering density produced in the primary sintering is from 80 to 95% based on the theoretical density.

5. A process for producing a silicon carbide heating element as in claim 1, wherein said boron compound contains B, $B_4C$, BN, BP, $AlB_2$ or $SiB_6$.

6. A process for producing a silicon carbide heating element as in claim 1, wherein said carbon compound contains a phenol resin, carbon black, polyphenylene, or polymethylphenylene.

* * * * *